United States Patent [19]

Iwato et al.

[11] 4,450,200

[45] May 22, 1984

[54] COATING COMPOSITION AND COATED ARTICLE

[75] Inventors: Susumu Iwato, Urayasu; Tatuo Nakamura; Takeo Kurauchi, both of Tokyo, all of Japan

[73] Assignee: Nippon Paint Co., Ltd., Osaka, Japan

[21] Appl. No.: 408,843

[22] Filed: Aug. 17, 1982

[51] Int. Cl.$^3$ .................... B32B 5/16; B32B 15/08
[52] U.S. Cl. .................... 428/323; 428/331; 428/458; 428/480; 524/423; 524/450; 524/451; 524/597; 524/601; 525/443
[58] Field of Search ............ 428/480, 458, 323, 331; 525/443; 524/423, 450, 451, 601, 597

[56] References Cited

U.S. PATENT DOCUMENTS 4,359,500  11/1982  Schweitzer .................... 428/480 X Primary Examiner—Thomas J. Herbert, Jr.
Attorney, Agent, or Firm—Armstrong, Nikaido, Marmelstein & Kubovcik

[57] ABSTRACT

A composition forming coated films having an excellent chipping resistance, containing:

A. at least one polyester resin derived from (1) at least one acid component selected from the group consisting of dibasic acids and derivatives thereof and (2) at least one alcohol component selected from the group consisting of polyhydric alcohols and derivatives thereof; and B. at least one aminoplast resin having a number-average molecular weight of 800 to 1400, The polyester resin containing at least 20% by weight of the acid component being an aliphatic dibasic acid having 4 to 10 carbon atoms and at least 20% by weight of the alcohol component being a dihydric alcohol having 2 to 6 carbon atoms, the polyester resin having a number-average molecular weight of 2000 to 4000, a hydroxyl number of 30 to 75 and an acid number of 5 to 15.

The weight ratio of the polyester resin to the aminoplast resin is 60/40 to 95/5. The coated film of the coating composition has an elongation of 20% to 100% and a static glass transition temperature of $-10°$ C. to 20° C.

This coating composition also contains 2% to 20% by weight of ultrafine talc powder, 2% to 40% by weight of ultrafine barium sulfate powder or 2% to 40% by weight of a mixture of ultrafine talc and ultrafine barium sulfate, each based on the total solid amount of the coating composition.

6 Claims, No Drawings

COATING COMPOSITION AND COATED ARTICLE

The present invention relates to a coating composition, more specifically to a coating composition capable of forming coatings having excellent chipping resistance.

It is well-known in the art that paint coating of automobiles, especially at the bottom surface and side face portions are often damaged by stones or small rocks thrown up during the passage of the automobiles thereover. This eventually affects the durability of the automobiles themselves. This so-called "chipping phenomenon" is particularly conspicuous in the cold northern regions of the U.S., Canada, and the Scandinavian countries. Where rock salt and gravel are scattered on roads. The phenomenon is also noticeable in rural areas where many roads are unpaved.

The problem with conventional automotive paint coats has been that chipping easily damages the coatings to the substrate metal, resulting in rusting and rapid rust growth on the automobile bodies. The chipping resistance is one of the desired function of coatings for automobiles, i.e., rust-prevention.

Various attempts have been made to eliminate the problems caused by chipping. For instance, Japanese Examined Patent Publication (Kokoku) No. 52-43657/77 discloses the inclusion of a special ultrafine silk mica in a coating composition to produce a coating composition suitable for use as an intermediate coat for automobiles and capable of forming a chipping-resistant coating. Further, Japanese Examined Patent Publication (Kokoku) No. 53-45813/78 and Japanese Unexamined Patent Publication (Kokai) No. 55-56165/80 disclose a method for coating chipping-resistant films and a chipping-resistant and corrosion-resistant intermediate coating composition.

However, these proposals are intended to solve chipping problems caused by the small-sized stones i.e., so-called "soft chipping". They are not intended to solve so-called "hard chipping", which occurs on such more exposed areas of automobile bodies as side sills and the front of hoods.

For these "hard chipping" areas, automobile manufactures used what are called stone guard compositions. The stone guard coating compositions usually contain polyvinyl chloride sol, rubber latex, or urethane resins as a main ingredient and further optionally contain bitumen and thermoplastic elastomers as binders, graphite, calcium carbonate, talc, and other pigments, vermiculite, perlite, woodmeal asbestos, and sand or fibers as fillers. Thus, a thick coating having a thickness of 300 to 1000 $\mu$m is obtained.

Stone guard coating compositions, however, have their problems and therefore cannot be economically or efficiently applied for both soft chipping and hard chipping areas. Stone guard coating compositions have high viscosity and, therefore, cannot be applied by conventional air spray coating. They require an airless spray having a large discharge. More important, the surface appearance of the resultant stone guard coat is poor since the coat is applied as a thick film. Application of an over coat to the stone guard coat further reduces the surface finish appearance. As a result, the stone guard coat compositions can only be used for coating the bottom portions of an automobile body. Furthermore, stone guard coat compositions cannot be applied to the so-callled "gradient coating" in which the coated film thickness is gradually decreased. This is because the surface appearances are different depending upon the film thickness of the stone guard coat, and because extraneous phenomena such as "cratering" are caused, to the area where stone guard coat composition is applied as a mist, by the differences in the surface tension and in the phenomena of the curing and the melt. These phenomena adversely affect the surface conditions of the upper coat. For these reasons, stone guard coat compositions are only applied, by means of a masking, to the bottom portions of automobile bodies.

In any case, no one has yet developed chipping-resistant coating materials capable of solving both the problems of soft and hard chipping.

Accordingly, the objects of the present invention are to eliminate the above-mentioned problems of the prior arts and to provide a coating composition capable of preventing both the soft and hard chipping and of imparting a coated film having good surface appearance and physical properties.

Other objects and advantages of the present invention will be apparent from the following description.

In accordance with the present invention, there is provided a coating composition comprising:

A. at least one polyester resin derived from (1) at least one acid component selected from the group consisting of dibasic acids and the esters and the ester-forming derivatives thereof and (2) at least one alcohol component selected from the group consisting of polyhydric alcohols and the ester-forming derivatives thereof; and B. at least one aminoplast resin having a number-average molecular weight of 800 to 1400. The polyester resin contains at least 20% by weight, based on the total amount of the acid component, of an aliphatic dibasic acid having 4 to 10 carbon atoms and at least 20% by weight, based on the total amount of the alcohol component, of a dihydric alcohol having 2 to 6 carbon atoms. The polyester resin has a number-average molecular weight of 2000 to 4000, a hydroxyl number of 30 to 75, and an acid number of 5 to 15. The weight ratio, in terms of a solid content, of the polyester resin to the aminoplast resin is 60/40 to 95/5. A coated film of the coating composition has an elongation of 20% to 100% and a static glass transition temperature of $-10°$ C. to $20°$ C.

The polyester resins usable in the compounding of the present coating composition are those prepared by polymerizing (i) dibasic acids and/or their ester forming derivatives and (ii) polyhydric alcohols and/or their ester forming derivatives.

Examples of the dibasic acids are phthalic acid, isophthalic acid, terephthalic acid, adipic acid, sebacie acid, maleic acid, azelaic acid, and itaconic acid. Examples of the ester-forming derivatives of the dibasic acids are the anhydrides of the dibasic acids, the esters of the dibasic acids, such as dimethylterephthalate dimethyl 1,4-cyclohexane-dicarboxylate and dimethyltricyclo[5,2,1,0$^{2,6}$]decane-3(4),8(9)-dicarboxylate, and diisocyanates. These compounds can be used alone or in any mixture thereof.

Examples of the polyhydric alcohols are neopentyl glycol, ethylene glycol, 1,6-hexanediol, diethylene glycol, propylene glycol, dipropylene glycol, cyclohexane dimethanol, trimethylpentane diol, 1,3-butane diol, trimethylol propane, trimethylol ethane, and glycerine. Examples of the ester forming derivatives of the polyhydric alcohols are the esters of the above-mentioned dibasic acids, such as ethylene glycol terephthalate, diethylene glycol terephthalate and neopentyl glycol adipate. These compounds can be used alone or in any mixture thereof.

It should be noted that the polyester resins used in the present invention contain at least 20% by weight, based on the total amount of the acid component, of an aliphatic dibasic acid having 4 to 10 carbon atoms and at least 20% by weight, based on the total amount of the alcohol component, of a dihydric alcohol having 2 to 6 carbon atoms.

Examples of the aliphatic dibasic acids having 4 to 10 carbon atoms are adipic acid, sebacic acid, maleic acid, azelaic acid, and itaconic acid. These linear aliphatic dibasic acids are desirable because they impart soft and flexible properties to the polyester resins. Examples of the dihydric alcohols having 2 to 6 carbon atoms are ethylene glycol, 1,6-hexanediol, diethylene glycol, trimethylpentane diol, 1,3-butemediol, propylene glycol, and triethylene glycol. These dihydric alcohols are desirable because they also impart soft and flexible properties to polyester resins. The polyester resins containing 20% by weight or more of these dibasic acids and 20% by weight or more of these dihydric alcohols result in the desired elongation percent and static glass transition temperature.

The polyester resin used in the present invention should have a number-average molecular weight (Mn) of 2000 to 4000, a hydroxyl number of 30 to 75, desirably 35 to 60, and an acid number of 5 to 15. A polyester resin having an Mn of more than 4000 would increase the viscosity of the resin, making it difficult to produce a high concentration coating composition and to apply a thick coat. Contrary to this, a polyester resin having an Mn of less than 2000 would results in an undesirably brittle coating.

A polyester resin having a hydroxyl number of less than 30 has decreased compatibility with aminoplast resin. The decreased compatibility results in undesired gloss and also in undesired wetting of the resin with pigments during a pigment dispersing operation. Thus, so-called "flocculation" is likely to occur due to the insufficient wetting of the resin with the pigments and the so-called "hazing" readily occurs.

A polyester resin having a hydroxyl number of more than 75 results in the undesirable change of the reactivity thereof with the aminoplast resin depending on baking conditions.

A polyester resin having an acid number of less than 5 does not react well with aminoplast resin, whereas a polyester resin having an acid number of more than 15 results in the undesirable affect on the reactivity thereof with the aminoplastic resin depending on baking conditions.

The terms "number-average molecular weight", "hydroxyl number", and "acid number" used herein means the following:

1. Number-average molecular weight (Mn): The value determined by using a GPC model 1A-R (manufactured by Shimadzu Seisakusho, Japan).
2. Hydroxyl number: The number of milligrams of KOH necessary to neutralize the carboxyl group corresponding to the hydroxyl group contained in 1 g of a sample.
3. Acid number: The number of milligrams of KOH necessary to neutralize the free carboxyl group contained in 1 g of a sample.

The polyester resins usable in the present invention can be produced by reacting an acid component and an alcohol component desirably selected from the above-mentioned dibasic acids, polyhydric alcohols, and the ester-forming derivatives thereof in the presence of, if necessary, a conventional esterification catalyst such as dibutyltin oxide under the conditions of, for example, a reaction temperature of 180° C. to 200° C. and a reaction time of 1 to 2 hours. Then, the reaction mixture is heated to 200° C. to 240° C. or more to form a polyester resin having the desired number-average molecular weight, hydroxyl number, and acid number. The resultant polyester resins can be diluted in a conventional aromatic, ester, or ketone solvent.

As mentioned above, the weight ratio of the polyester resin to the aminoplast resin (i.e., polyester resin/aminoplast resin) in the coating composition of the present invention is 60/40 to 95/5, desirably 65/35 to 85/15, in terms of solid content. A coating composition having a ratio of less than 60/40 is subject to self-condensation of the excess methylol groups due to the relative decrease in the hydroxyl number of the polyester resin, whereby the resultant coating film becomes rigid and the adhesion property of the coating is decreased. Further the compatibility of the polyester resin which the aminoplast resin may be decreased. A coating composition having a ratio of more than 95/5 has a decreased cross linking density of the polyester resin and the aminoplast resin, which, in turn, causes decreased humidity resistance of the resultant coating.

The static glass transition temperature (a static Tg) of the coating obtained from the coating composition of the present invention should be $-10°$ C. to 20° C., desirably $-5°$ C. to 5° C. The "static Tg" used herein is defined as the temperature at which a correlation curve of specific volumes of resin and temperatures is turned. It is distinguished from the so-called "dynamic glass transition temperature", which is determined while the resin is vibrated by a vibrating machine, for example, Vibron ®. A coating film having a static Tg of more than 20° C. shows an undesirably low chipping resistance, whereas a coating having a static Tg of less than $-10°$ C. tends to crack when, applied in layers. Thus, the coating composition capable of forming a coating film having an extremely high durability for environment resistance, even against hard chipping, as compared with conventional chipping-resistant coating compositions, is provided by adjusting the static Tg of the coating film to a temperature of $-10°$ C. to 20° C. This results, in the desired chipping resistance being exhibited under the temperature conditions most severe for chipping.

The use of the coating composition of the present invention can effectively prevent both soft chipping and hard chipping. Of course, there is not clear boundary between "soft chipping" and "hard chipping". The term "hard chipping" merely derives from the term "hard chipping stone guard coat" referring to material able to withstand use on portions such as the side sills and the front of the hood of automobile bodies.

When the chipping resistant coating composition of the present invention containing the specified soft polyester resin is used, a coating film having no substantial difference in the surface visual appearance of the coating film having a thickness of 0 to 150 μm and applied by conventional "gradient coating" of stone guard coat composition and having sufficient hard chipping resistance and no substantial surface roughening in a dusting portion even in a thin film (e.g., 2 to 150 μm). Accordingly, the masking step required for conventional stone guard coat before coating can be omitted.

The coating composition of the present invention can further contain inorganic pigments such as metallic oxides (e.g., titanium oxide, iron oxides, and magnesium oxide) and nonferrous metal compounds (e.g., aluminum silicate, strontium chromate, and zinc chromate), and organic pigments such as carbon black, phthalocyanine blue, phthalocyanine green, quinacridone, flavanthrone, and benzimidazolone. These pigments can be used alone or in any mixture thereof. Although there is no limitation in the compounding amount of these pigments, the pigment can be compounded into the composition generally in an amount of 10 to 70% by weight, desirably 30 to 60% by weight, based on the total solid amount of the coating composition. The coating composition containing a too large amount of the pigment results in the brittle coating film, whereas the coating composition containing a too small amount of the pigment results in the ready generation of the substrate scratches (or damage), "popping" and "sagging".

It has also been found that the inclusion of ultrafine barium sulfate, together with titanium oxide or other inorganic pigments, or carbon black or other organic pigments, in the coating composition of the present invention can result in the good stabilization of the dispersed pigment or pigments to prevent the undesirable flocculation and in the further increase in the uniformity of the resulting coating film.

The "ultrafine barium sulfate" used herein means barium sulfate powder having an average particle diameter of 0.1 μm or less and a particle diameter of at least 90% by weight, desirably 100% by weight, of the primary particles of 0.2 μm or less. The ultrafine barium sulfate is usually compounded into the coating composition in an amount of 2% to 40% by weight based on the total solid amount of the coating composition. The desirable pigment volume concentration (PVC) is about 15% to about 40%. A compounding ratio of the ultrafine barium sulfate of less than 2% by weight does not result in the desired flocculation preventing effect, whereas a compounding ratio of more than 40% by weight results in the undesirably brittle coating film.

It has further been found that the inclusion of ultrafine talc in the coating composition of the present invention can result in a further improvement in the chipping resistance of the resultant coating film. The "ultrafine talc" used herein means talc having an average particle diameter of 2 μm or less and particle diameter of at least 90% by weight, desirably 100% by weight, of the primary particles of less than 5 μm, desirably 2 μm or less.

These ultrafine powder particles have more spherical shapes as compared with the conventional talc powder and barium sulfate powder and also have a remarkably large specific surface area. It appears to be for these reasons that the above-mentioned desirable effects are obtained. However, ultrafine calcium carbonate is not good because it has poor water resistance.

The ultrafine talc is usually compounded into the coating composition in an amount of 2% to 20% by weight, desirably 5 to 20% by weight, based on the total solid amount of the coating composition. The compounding ratio of the ultrafine talc of less than 2% by weight does not result in the desired flocculation preventing effect, whereas the compounding ratio of more than 20% by weight results in the high viscosity of the coating composition due to the high oil absorption in the undesirable low gloss of the coating film, and in an undesirably brittle coating film.

The ultrafine talc and the ultrafine barium sulfate can be compounded into the coating composition in any mixture thereof in an amount of 2% to 40% by weight.

The chipping resistance of the coating composition is also affected by the compounding of pigments. For instance, the use of a large amount of a pigment such as talc having a relatively large particle size results in the large peeling off area due to cohesive failure and, therefore, results in the undesirable surface appearance. However, for example, when ultrafine barium sulfate powder having a particle size of 0.1 μm or less is compounded, the scattered stone energy can be absorbed without extending the peeling-off area and, therefore, the generation of scratches in substrate can be extremely decreased. When the soft polyester resin containing coating composition of the present invention is used under an intermediate coating or under a conventional chipping resistant coating composition, the compounding of titanium pigments into the present coating composition is not recommended in the case of a relatively large quantity of titanium dioxide is compounded in an upper coating composition or a chipping resistant intermediate coating composition. This is because the compounding of titanium pigments results in a hard coating film having a low Young's modulus and also results in unsatisfactory surface appearance. Accordingly, it is desirable to compound as little titanium pigments into the present coating composition as possible.

Conventional coating of automobiles in automotive manufacturer is generally carried out, for example, in the following eight steps.

1. Pretreatment: conversion coating with, for example zinc phosphate or iron phosphate.
2. Under coating: Application of an electrondeposition primer for the purpose of rust prevention.
3. Baking: Baking of under coating.
4. Primary intermediate coating: Application of a chipping resistant intermediate coating composition.
5. Secondary intermediate coating: Application of an intermediate coating for the purpose of enabling a beautiful finish of an upper coating composition (wet-on-wet coating).
6. Baking: Baking of primary and secondary intermediate coating compositions.
7. Upper coating: Application of a metallic coating composition and clear coating composition, or a nonmetallic colored coating composition. In the case of the metallic coating, the metallic coating composition and the clear coating composition are applied in a wet-on-wet method.
8. Baking: Baking of upper coating composition.

In this coating process, the coating composition of the present invention can be applied between step 3 and 4 or can be used as an intermediate coating composition at step 4.

Japanese Examined Patent Publication (Kokoku) No. 54-73836/79 discloses the use of soft type polyurethane materials as a chipping resistant material (i.e. stone guard coat). However, the elongation percent of this coated film is 10 to 300%. When the elongation is more than 100%, the static Tg of the film is less than −10° C. Accordingly, when these materials are used in combination with conventional intermediate and upper coating compositions, especially a conventional upper coating composition of which film generally has a static Tg of 15° to 40° C. in view of the required quality of the upper coat, the difference in the static Tg between the adjacent filmlayers becomes undesirably large and also the strength of the film is small.

For instance, static Tg, linear expansion coefficients α and elongations of conventional chipping resistant coating compositions and the present coating composition can be summarized as follows.

| Coating Composition | Static Tg (°C.) | α(T > Tg) × $10^{-4}$ | α(T < Tg) × $10^{-4}$ | Elongation *6 (%) |
|---|---|---|---|---|
| Under coating electrodeposition composition *1 | 70 | 1.36 | 0.73 | 3 |
| Conventional intermediate coating composition *1 | 26 | 1.6 | 0.73 | 5 |
| Upper coating composition *3 | 37 | 1.7 | 1.14 | 3 |
| Soft type urethane stone guard coat *4 | less than −10° C. | 1.55 | could not determined | 150 |
| Present coating composition | 10 | 1.6 | 0.75 | 80 |

*1 Powertop U-30 (cationic electrodeposition coating composition manufactured by Nippon Paint Co., Ltd.)
*2 Orga S-52-E Sealer (polyester type intermediate coating composition manufactured by Nippon Paint Co., Ltd.)
*3 Orga G-25 white (melamine-alkyd type coating composition manufactured by Nippon Paint Co., Ltd.)
*4 RP primar (Polyurethane type SGC manufactured by Nippon Paint Co., Ltd.)
*5 See Example 1
*6 Elongation Percent: Test pieces were prepared as follows. That is, coating composition samples were spray coated onto tinplates and, then, baked to form films having a dry thickness of about 100 μm. The coated tinplates were cut into pieces each having a size of 10 mm × 70 mm and the films were peeled off from the tinplates by using the so-called mercury amalgam method.

The elongations of the test pieces of the films were determined by drawing the test pieces under the conditions of a temperature of 20° C., a humidity of 75% and a draw rate of 10 mm/min (the initial length of the test pieces between the grips was 30 mm) in a tension determining apparatus (Tensilon Model UTM-III manufactured by Tokyo Baldwin Co., Ltd).

Coating films obtained by coating the above-mentioned soft type polyurethane compounding coating composition and polyvinyl chloride sol (see Comparative Examples 5 and 6) in a conventional manner were subjected to a chipping test by using a GRAVALO Meter ® (Q PANEL CO.) and, then, subjected to a thermocycle test (i.e., 8 hr's blister test→1 hour at a room temperature→6 hour at −20° C.→1 hour at a room temperature→6 hour at 80° C.→2 hour at a room temperature). As a result, cracking phenomenon was observed from the chipping marks after one or two cycles. This cracking phenomenon was also confirmed by a salt-spray test after the chipping test or an exposure test for one year at Okinawa, Southern part of Japan. These materials cannot be applied to conspicuous portions such as the hoods of automobiles and the sides of automobiles. The cracking is believed to occur in the course of the temperature changes in the cycle test for the following reasons. The film layers are repeatedly subjected to a temperature region less than the static Tg thereof and a temperature region more than the static Tg thereof, whereby the film layers are expanded and shrinked according to the linear expansion coefficients thereof at ambient temperature. The values of the linear expansion coefficients α are considerably different depending upon the temperature differences between the ambient temperatures and the static Tg. Thus, the laminated films are warped. In this case, when one layer is strongly adhered to, for example, a steel surface, shear occurs between said layer and the adjacent coating film layer, or a stress is concentrated to the weak portions where the chipping marks are generated. Thus, cracking occurs by action of a certain force. Furthermore, it is commonly carried out, especially in automobile coating to reapply over coating composition to the coated articles for covering the undesired portions, where "popping" or "sagging" is generated, or dusts are adhered. However, a coating composition having a too low static Tg is used, cracking occurs in the upper coat at one thermocycle even by adjusting the pigment concentration in the composition (The increase in the pigment concentration results in the decrease in the linear expansion coefficient).

The aminoplast resins usable in the present invention can be any conventional aminoplast resins used in conventional coating compositions, so long as they have a number-average molecular weight of 800 to 1400. Examples of such resins are alcohol-modified melamine resins (e.g., methylol, ethylol, isopropylol, n-butylol and iso-butylol melamine resins), urea resins and benzoquanamine resins. The aminoplast resins having a molecular weight of less than 800 do not result in the desirable good chipping property, because the aminoplast resins having a lower molecular weight have poor reactivity. Contrary to this, the aminoplast resins having a molecular weight of more than 1400 result in no good appearance, because this aminoplast resins have poor affinity with polyester resins.

The weight ratio of the resin to the pigment contained in the coating film component of the present invention is generally 65/35 to 20/80, desirably 60/40 to 30/70. The increase in the static Tg of the composition is at most about 5° C. to about 10° C. due to the compounding of the pigment into the coating composition.

The coating composition of the present invention can contain any organic solvents such as aromatic, ester, ketone and alcohol solvents, which are conventionally used for coating compositions. The coating composition of the present invention can further contain, as an optional component, any conventional additives or ingredients suitable for use in the compounding of coating compositions, such as a segregation (or color separation) preventing agent, a leveling agent, and an anti-settling agent.

The present coating composition can be prepared or compounded by any known method. For instance, the above-mentioned polyester resin, inorganic and/or organic pigments, and ultrafine talc and/or ultrafine barium sulfate are ground to a desired particle size and dispersed by using a dispersing machine such as a sand grinding mill, a ball mill, and a roll mill and, then, the aminoplast resin, the solvent and the other optional additives are further added and uniformly stirred to produce a liquid coating composition.

The coating composition of the present invention can be applied, as an intermediate coat, to a primer coating surface (derived from, for example, electrodeposition coating or powder coating) on a substrate by a conventional coating method such as an air spray, or an electrostatic spray coating. The dry film thickness of the intermediate coat derived from the present coating composition is generally 20 to 150 μm, desirably 30 to 100 μm. Furthermore, the present coating composition is partially applied, in a desired thickness, to the portion where chipping resistance is required, and, then, a conventional intermediate coating can be applied thereon in the so-called "wet-on-wet" coating method. The applied coating composition is baked, for example, at a temperature of 120° to 160° C. for 20 to 30 minutes and, then, a conventional over coating composition such as an acryl, polyester or alkyd coating composition is applied thereon. Thus, the desired finish can be obtained.

The present invention now will be further illustrated by, but is by no means limited to, the following Examples, in which all percentages are expressed on a weight basis unless otherwise specified.

EXAMPLES 1 TO 9 AND COMPARATIVE EXAMPLES 1 TO 6

Polyester resins were prepared from the dibasic acids and the dihydric alcohols listed in Table 1 below in the amounts listed in Table 1 in a conventional manner in the presence of dibutyltin oxide catalyst. The result polyesters were dissolved with xylene and cellosolve acetate so as to adjust to a solid concentration of 60% in the solution. Then, coating composition samples were prepared according to coating composition recipes listed in Table 1 (10% of titanium dioxide and 0.05% of carbon black were further compounded in all coating compositions and butyl cellosolve was used as a solvent for a coating composition).

The present coating compositions and comparative and reference coating compositions were applied to test panels comprising SPC-1 dull steel panels each having a size of 100×150×0.8 mm and treated with zinc phosphate. First, powder or electrodeposition primer was applied to the test panels and, then, the coating composition samples were applied thereon by spray coating. Thereafter, conventional intermediate coating composition, Orga S-52 E Sealer (polyester type intermediate coating composition manufactured by Nippon Paint Co., Ltd.) was applied in the so-called "wet-on-wet" method so as to form a dry film thickness of 30 μm and, finally, the coated coating compositions were baked under the conditions of 140° C.×30 min. To the intermediate coating films thus obtained, an alkyd resin type upper coating composition, Orga G-25 White (manufactured by Nippon Paint Co., Ltd.) was applied so as to obtain the dry film thickness of 35 to 45 μm and was baked under the conditions of 140° C.×30 min.

The results are shown in Table 2.

TABLE 1

| | Example | | | | | | | | | Comparative Example | | | | |
|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 |
| Acid component | | | | | | | | | | | | | | | |
| Isophthalic acid | 40 | 35 | | | | | | | | | | | | | |
| Phthalic anhydride | | | 30 | 25 | 20 | 20 | 20 | 20 | 40 | 50 | 55 | 45 | 45 | | |
| Adipic acid | 20 | | 35 | | | | | | | 10 | | | | | |
| Sebacic acid | | | | | 40 | 40 | 50 | 40 | 20 | | | | | | |
| Maleic acid | | 20 | | 25 | | | | | | | | | 15 | | |
| Alcohol component | | | | | | | | | | | | | | | |
| 1,6-Hexane diol | | | | 20 | | | | | | | | | | | |
| Ethylene glycol | 30 | | | | 20 | 20 | 30 | 20 | 30 | | 10 | | | Flexible urethane *12 | Vinyl chloride Sol *13 |
| Diethylene glycol | | 30 | | | | | | | | | | | | | |
| Trimethylol propane | | 15 | | | 20 | | 20 | | | | | | | | |
| Trimethylol ethane | | | 20 | | | | | | | | | 5 | 20 | | |
| Propylene glycol | | | | 30 | | | | | | | | | | | |
| Neopentyl glycol | 10 | | | | | | | | | | | | | | |
| Pentaerythritol | | | | | | | | | 10 | 40 | 35 | 50 | 30 | | |
| Total | 100 | 100 | 100 | 100 | 100 | 100 | 100 | 100 | 100 | 100 | 100 | 100 | 100 | | |
| Hydroxyl number | 50 | 75 | 30 | 40 | 50 | 50 | 40 | 55 | 50 | 35 | 70 | 100 | 60 | | |
| Acid number | 7 | 5 | 5 | 15 | 7 | 10 | 10 | 12 | 7 | 8 | 15 | 20 | 8 | | |
| Molecular weight (Mn) | 2600 | 3000 | 3500 | 4000 | 3300 | 2500 | 3000 | 2000 | 2600 | 2500 | 3500 | 8000 | 3500 | | |
| Aminoplast resin | *1 | *2 | *3 | *4 | *5 | *6 | *7 | *6 | *1 | *1 | *2 | *3 | *4 | | |
| Polyester resin/ Aminoplast resin | G-821-60 80/20 | MX-40 80/20 | ZOSE 27 80/20 | ZOSE 85/15 | 325 90/10 | P-138 85/15 | TD-126 85/15 | P-138 60/40 | G-821-60 80/20 | G-821-60 80/20 | MX-40 80/20 | BF-10 80/20 | ZOSE 60/40 | | |
| Pigment Type | BF-10 *8 | LMR-100 *9 | | | | | BF-1 *10 | | BF-1 *8 35 | *11 | — | BF-10 *8 | BF-10 *8 | | |
| Amount (%) | 40 | 5 | | | — | — | 10 | — | LMR-100 *9 3 | 40 | 35 | 40 | 10 | | |
| Static glass transition temperature (°C.) of baked film | 5 | 0 | −5 | −2 | −9 | −8 | 2 | 18 | 5 | 35 | 6 | 5 | 15 | −10 | −5 |
| Elongation (%) | 55 | 55 | 70 | 60 | 90 | 95 | 58 | 25 | 55 | 20 | 35 | 40 | 10 | | |

Remarks:
*1 Isobutyletherified melamine resin manufactured by Dai-Nippon Ink and Chemicals Inc.
*2 Methyletherified melamine resin manufactured by Sanwa Chemicals Co., Ltd.
*3 Isobutyletherified melamine resin manufactured by Hitachi Chemical Co., Ltd.
*4 Butyletherified melamine resin manufactured by Mitsui Toatsu Chemical Inc.
*5 Methyletherified melamine resin manufactured by Mitsui Toatsu Chemical Inc.
*6 Urea resin manufactured by Dai-Nippon Ink and Chemicals Inc.
*7 Urea resin manufactured by Dai-Nippon Ink and Chemicals Inc.
*8 Ultrafine barium sulfate powder having an average diameter of primary particles of about 0.05 μm manufactured by Sakai Chemicals Industry Co., Ltd.
*9 Ultrafine talc powder having an average diameter of primary particles of about 1 μm manufactured by Fuji Talc Co., Ltd.
*10 Ultrafine talc powder having an average diameter of primary particles of about 1 μm manufactured by Sakai Chemicals Industry Co., Ltd.
*11 Calcium carbonate powder manufactured by Shiraishi Kogyo Co., Ltd.
*12 Prepared by crosslinking the following product with ethylene glycol in the presence of a alkali metal oxide catalyst. That is, OH groups were introduced into the ends of butadiene polymer and urethanized by an excess amount of tolyene diisocyanate (TDI). The remainder of TDI was blocked by ethylalcohol.
*13 Thermoplastic film derived from a mixture of a dispersion type vinyl chloride resin Zeon #121 (manufactured by Nippon Zeon Co., Ltd.), an adhesive resin (including nitrile rubber and maleated vinyl chloride resin), a plasticizer, a stabilizer and a pigment.

TABLE 2

| | Under coating composition | Dry film thickness (μm) | Chipping property *3 | Visual surface appearance *4 | Dust portion *5 | One thermocycle after chipping *6 | Water vapor resistance (120 hours) | 180° Bending with cut *8 (10 mmφ) | Chipping thermocycle of over coat *6 (35 μm × twice) |
| --- | --- | --- | --- | --- | --- | --- | --- | --- | --- |
| Example | | | | | | | | | |
| 1 | Cationic ED *1 (20μ) | 50 | 0 | ++ | + | + | + | + | ++ |
| 2 | Cationic ED *1 (20μ) | 50 | 0 | ++ | + | + | + | + | ++ |
| 3 | Cationic ED *1 (20μ) | 50 | 1 | ++ | + | + | + | ++ | ++ |
| 4 | Cationic ED *1 (20μ) | 50 | 2 | ++ | + | + | + | ++ | ++ |
| 5 | Cationic ED *1 (20μ) | 50 | 2 | ++ | + | + | + | ++ | ++ |
| 6 | Powder under coating *2 (70μ) | 50 | 0 | ++ | + | + | + | − | ++ |
| 7 | Cationic ED *1 (20μ) | 50 | 0 | ++ | + | + | + | ++ | ++ |
| 8 | Cationic ED *1 (20μ) | 50 | 1 | ++ | + | + | + | + | ++ |
| 9 | Cationic ED *1 (20μ) | 50 | 0 | ++ | + | + | + | + | ++ |
| Comparative Example | | | | | | | | | |
| 1 | Cationic ED *1 (20μ) | 50 | 1 | ++ | + | + | −− | + | ++ |
| 2 | Cationic ED *1 (20μ) | 50 | 3 | ++ | + | + | + | − | ++ |
| 3 | Cationic ED *1 (20μ) | 50 | 60 | ++ | + | + | + | − | ++ |
| 4 | Cationic ED *1 (20μ) | 50 | 40 | ++ | + | + | + | − | ++ |
| 5 | Cationic ED *1 (20μ) | 150 | 2 | + | − | − | + | − | −− |
| 6 | Cationic ED *1 (20μ) | 500 | 2 | −− | −− | − | −− | −− | − |

Remarks:
*1 Power Top U-30, electrodeposition coating composition manufactured by Nippon Paint Co., Ltd.
*2 Powdex P, Powder coating composition manufactured by Nippon Paint Co., Ltd.
*3 A salt-spray test was carried out in a Q PANEL GRAVALO METER ® by using a test piece having a size of 10 × 15 cm under the conditions of #6 crushed stone, an air pressure of 5 kg/cm² and 500 g weight × 5 times. The amount of rusts (i.e. the number of the substrate scratches) were counted after 120 hours.
*4 Visual determination (orange peel determination)
*5 Visual appearance was observed after applying the dust of the materials of Examples and Comparative Examples on ED (electrodeposition) or PD (powder) primer by a gradient coating, followed by intermediate coating and, then, upper coating.
*6 One cycle comprises 16 hours in a blister box 5 hours at 20° C. → 3 hours at −30° C. → 0.5 hours at 20° C. → 3 hours at 80° C. → 1 hour at 20° C. (24 hours in total)
*7 According to a JIS (Japanese Industrial Standards)-Z-0236 method (120 hours)
*8 After marking an H-type cross-cut on the test pieces, a mandrel type bending test was carried out.
Evaluation score standards of each test
++: Excellent
+: Good
−: Fair
−−: Poor

We claim:

1. A multilayer coated article having an intermediate coat derived from a coating composition comprising:
   A. at least one polyester resin derived from (1) at least one acid component selected from the group consisting of dibasic acids and the esters and the ester-forming derivatives thereof and (2) at least one alcohol component selected from the group consisting of polyhydric alcohols and the ester-forming derivatives thereof; and
   B. at least one aminoplast resin having a number-average molecular weight of 800 to 1400,
   said polyester resin containing at least 20% by weight, based on the total amount of the acid component, of an aliphatic dibasic acid having 4 to 10 carbon atoms and at least 20% by weight, based on the total amount of the alcohol component, of a dihydric alcohol having 2 to 6 carbon atoms, and
   C. 2% to 20% by weight of ultrafine talc, 2% to 40% by weight of ultrafine barium sulfate, or 20% to 40% by weight of a mixture of ultrafine talc and ultrafine barium sulfate, said amounts of ultrafine talc and ultrafine barium sulfate being based on the total solid amount of said composition,
   said polyester resin having a number-average molecular weight of 2000 to 4000, a hydroxyl number of 30 to 75, and an acid number of 5 to 15,
   the weight ratio, in terms of a solid content, of the polyester resin to the aminoplast resin being 60/40 to 95/5,
   wherein said coated film of said coating composition has an elongation of 20% and a static glass transition temperature of −10° C. to 20° C.

2. A coated article as claimed in claim 1, wherein said ultrafine talc has an average particle diameter of 2μ or less and a particle diameter of at least 90% by weight of the primary particles of less than 5μ.

3. A coated article coating composition as claimed in claim 1, wherein said ultrafine barium sulfate has an average particle diameter of 0.1μ or less and a particle diameter of at least 90% by weight of the primary particles of 0.2μ or less.

4. A coating composition comprising:

A. at least one polyester resin derived from (1) at least one acid component selected from the group consisting of dibasic acids and the esters and the ester-forming derivatives thereof and (2) at least one alcohol component selected from the group consisting of polyhydric alcohols and the ester-forming derivatives thereof; and B. at least one aminoplast having a number-average molecular weight of 800 to 1400, said polyester resin containing at least 20% by weight, based on the total amount of the acid component, of an aliphatic dibasic acid having 4 to 10 carbon atoms and at least 20% by weight, based on the total amount of the alcohol component, of a dihydric alcohol having 2 to 6 carbon atoms, and C. 2% to 20% by weight of ultrafine talc, 2% to 40% by weight of ultrafine barium sulfate, or 2% to 40% by weight of a mixture of ultrafine talc and ultrafine barium sulfate, said amounts of ultrafine talc and ultrafine barium sulfate being based on the total solid amount of the coating composition, said polyester resin having a number-average molecular weight of 2000 to 4000, a hydroxyl number of 30 to 75, and an acid number of 5 to 15, the weight ratio, in terms of solid content, of the polyester resin to the aminoplast resin being 60/40 to 95/5, whereby a coated film of said coating composition has an elongation of 20% to 100% and a static glass transition temperature of $-10°$ C. to $20°$ C.

5. A coating composition as claimed in claim 4, wherein said ultrafine talc has an average particle diameter of $2\mu$ or less and a particle diameter of at least 90% by weight of the primary particles of less than $5\mu$.

6. A coating composition as claimed in claim 4, wherein said ultrafine barium sulfate has an average particle diameter of $0.1\mu$ or less and a particle diameter of at least 90% by weight of the primary particles of $0.2\mu$ or less.

* * * * *